(12) United States Patent
Carelli

(10) Patent No.: US 9,072,228 B1
(45) Date of Patent: Jul. 7, 2015

(54) METHOD OF TREATING MULCH

(71) Applicant: Samuel P. Carelli, Linwood, NJ (US)

(72) Inventor: Samuel P. Carelli, Linwood, NJ (US)

( * ) Notice: Subject to any disclaimer, the term of this patent is extended or adjusted under 35 U.S.C. 154(b) by 73 days.

(21) Appl. No.: 13/888,783

(22) Filed: May 7, 2013

Related U.S. Application Data

(60) Provisional application No. 61/708,610, filed on Oct. 1, 2012.

(51) Int. Cl.
*A01G 7/00* (2006.01)
*A01G 13/00* (2006.01)

(52) U.S. Cl.
CPC ........ *A01G 13/0293* (2013.01); *A01G 13/0262* (2013.01)

(58) Field of Classification Search
CPC ................... A01G 13/0821; A01G 2013/004; C09K 17/52; C05F 11/00
USPC ..................................................... 47/9; 71/11
See application file for complete search history.

(56) References Cited

U.S. PATENT DOCUMENTS

| | | | | |
|---|---|---|---|---|
| 3,387,405 | A * | 6/1968 | Iwasky et al. | 47/9 |
| 3,427,194 | A * | 2/1969 | Woods et al. | 47/9 |
| 3,475,435 | A * | 10/1969 | Rothfelder | 111/186 |
| 3,954,129 | A * | 5/1976 | Rudell et al. | 206/423 |
| 4,932,156 | A | 6/1990 | Underwood | |
| 5,585,150 | A | 12/1996 | Sheehan | |
| 6,293,045 | B1 * | 9/2001 | Morgan | 47/9 |
| 6,301,829 | B1 | 10/2001 | Kaufmann | |
| 6,523,299 | B2 * | 2/2003 | Morris | 47/9 |
| 6,745,513 | B2 * | 6/2004 | Krysiak et al. | 47/9 |
| 7,765,735 | B1 | 8/2010 | Carelli | |
| 2002/0042962 | A1 * | 4/2002 | Willman et al. | 15/208 |
| 2006/0178272 | A1 | 8/2006 | Buono et al. | |
| 2007/0000167 | A1 | 1/2007 | Buono et al. | |
| 2007/0119334 | A1 | 5/2007 | Atkinson | |

* cited by examiner

*Primary Examiner* — Rob Swiatek
*Assistant Examiner* — Ebony Evans
(74) *Attorney, Agent, or Firm* — Sturm & Fix LLP

(57) ABSTRACT

The present invention provides a method of treating mulch by applying an adhesive composition to bulk mulch and then bagging the treated mulch before the adhesive cures. The bagged mulch is later transported to a desired location and arranged into a mulch bed, and the adhesive cures by exposure to air and sunlight, thereby holding the mulch in place and preventing undesirable movement.

8 Claims, 1 Drawing Sheet

Apply EVA Adhesive To Bulk Mulch
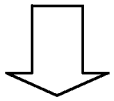
Bag Uncured Treated Mulch In Poly Bags
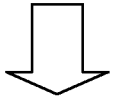
Transport Bags To Landscaping Site
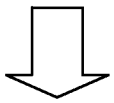
Remove Mulch From Bags And Spread Over Site
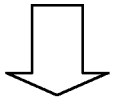
Curing Treated Mulch By Exposure To Air And Sunlight

METHOD OF TREATING MULCH

CROSS REFERENCE TO RELATED APPLICATIONS

This application claims the benefit of U.S. Provisional Patent Application Ser. No. 61/708,610 filed Oct. 1, 2012 entitled "Method of Treating Mulch", which is incorporated hereby by reference.

BACKGROUND OF THE INVENTION

1. Field of the Invention

This invention relates generally to the field of landscaping techniques, and more particularly to a method treating a mulch bed to prevent undesirable movement.

2. Description of the Related Art

As can be seen by reference to the following U.S. Pat. Nos. 4,932,156; 5,585,150; 6,301,829, U.S. Publn Nos. 20060178272; 20070000167; 200700119334, and U.S. Pat. No. 7,765,735, the prior art is replete with myriad and diverse mulch treatments.

While all of the aforementioned prior art methods are adequate for the basic purpose and function for which they have been specifically designed, they are uniformly deficient with respect to their failure to provide a simple, efficient, and practical method of preventing the undesirable movement of a mulch bed.

As a consequence of the foregoing situation, there has existed a longstanding need for a new and improved method of treating a mulch bed, and the provision of such a method is a stated objective of the present invention.

Those concerned with these and other problems recognize the need for an improved method of treating mulch.

BRIEF SUMMARY OF THE INVENTION

Briefly stated, the present invention provides a method of treating mulch including the steps of applying an adhesive composition to an amount of bulk mulch and then bagging the treated mulch before the adhesive cures. The bagged mulch is later transported to an area to be landscaped, and arranged into a desired mulch bed. The adhesive cures by exposure to air and sunlight, thereby holding the mulch in place and preventing undesirable movement.

DETAILED DESCRIPTION OF THE INVENTION

The present invention provides a method of treating mulch by applying an adhesive composition and then bagging the treated mulch before the adhesive cures. The bagged mulch is later arranged into a desired mulch bed, and the adhesive cures by exposure to air and sunlight, thereby holding the mulch in place and preventing undesirable movement.

The present invention may have a retardant, either by spraying it, or in a powdered form, applied to the mulch at the time of bagging that would enhance the shelf life of the product. In addition, an additive could be added before bagging to mitigate odor. Application mixture of water to additive formula could be between 4 to 1, and 8 to 1.

Broken, discarded and/or unusable pallets are shipped to recycling facilities around the country. From here the pallets are fed into a machine that shreds the pallets into medium sized chips. The chips are exposed to a magnetic field that removes any and all nails, staples, or wire residue still present in the chips. Chips are then exposed to a series of smaller grinding screen that reduce the chips to the desired size.

Applicant has found that the use of kiln dried pallet chips produces a quality product cleaner than that of traditional root mat and tree bark/wood commonly associated with producing landscape mulches. Nevertheless, while the first choice is pallet chips, utilizing traditional recycled wood products produced from the tree service industry is also acceptable. Comparable results are achieved with both types of products. However, the raw products produced from the tree industry contain considerably more moisture, thus making a heavier product which is more difficult to transport and handle.

The preferred liquid adhesive composition to be applied before bagging is an adhesive having a consistency similar to milk. The adhesive composition is made of 30-40 weight percent vinyl acetate polymers, less than 2 weight percent vinyl acetate monomers, 60-70 weight percent water, less than 2 weight percent toluene, and less than 0.005 weight percent biocide.

Ethylene vinyl acetate (EVA) is the preferred adhesive composition used in the method of the present invention. It is a copolymer of ethylene and vinyl acetate. It possess little or no odor and is resistant to UV radiation. This one characteristic allows the adhesive treated mulch product to keep its rich color as the EVA will cure on the wood chips in essence sealing the pigment/dye from fading in the sun, or washout associated with heavy rains.

Ethylene vinyl-acetate is one of the most widely used copolymers in the world. Widely used medicinally for purposes of drug delivery and biomedical engineering EVA's are also used daily in home applications such as food storage and Saran Wrap®.

The adhesive composition is formulated using approximately 30-40% vinyl acetate polymer, <2% vinyl acetate monomers, 60-70% water as well as <Toluene and <0.005% Biocide. Biocide is introduced into the formula as a preventative against growth of organisms or microbes in the mix. The adhesive composition contains no hazardous or toxic ingredients.

Applicant's adhesive composition formula is one that has been developed in conjunction with Spectrum Adhesives in Ohio. The product is shipped in its liquid water based form. The product can be mixed at various ratios to accommodate a wide range of possibilities. While the preferred ratio may be a 5 to 1 ratio, stronger applications can be administered to address more extreme conditions, such as on a steep slope or embankment, or when producing artistic designs and organic advertising.

The adhesive treated mulch will begin to cure immediately as it is removed from the bag and raked into the designated area. Many factors will influence the curing process: cooler temperatures will delay the curing process as the moisture will evaporate more slowly and may take up to 21 hours to cure. Hot, sunny and humid conditions will help to accelerate the curing process and stabilization of product could occur as rapidly as 2-4 hours.

Practicing the method of the present invention will not only prevent washout and windblown mulch from sidewalks and turf grass, but it also reduces the amount of mulch that is washed into storm sewer, curb lines and commercial industrial parking areas. Parking lots at large shopping malls after a significant rainfall include islands surrounded by a ring of mulch chips washed from their beds to the parking surface. Rarely is it removed and in most instances, the mulch is continually washed around the parking area until it reaches the drainage grate and enters the retention basin.

In applying of the EVA adhesive composition to the mulch, applicant utilizes existing technology with some modifications. For example, kiln dried pallet chips may be incorporated into a large hopper leading into a large tube with either a rotating auger or a large rotating tubular drum that will spin the mulch in a constant, but slow fashion. The adhesive composition will be premixed with organic pigments and/or dyes, as well as fresh water to create the desired ratios. The solution will be injected into the tube/drum at precise intervals to create a production run of a particular color. As the adhesive treated mulch leaves the tube/drum it travels via a moving belt to another hopper where it will be agitated once again enroute to the bagging area.

Bags will be filled with the precise amount and heat sealed at the top end. While the majority of filled bags will be the standard 2 cubic foot package, additional sizes may be offered to better suit the individual client for his or her application. Bags such as 1 cubic foot will be available for smaller jobs.

The bags may be a white poly bag with a minimum of 3 mil. strength approximately 21 inches wide and 35 inches long. The rear of the bag features detailed instructions and guidelines for the best possible results. A consumer hotline contact number will also appear on the bag to better assist the user. Bags will also be perforated minimally to allow air to escape during bagging and enhance the stacking process for secure transport. Also provided is one pair of disposable gloves for the consumer to wear while distributing the product throughout their garden area. Finally, an adhesive tab will be provided on the bag so the consumer can roll the bag tightly and seal shut for future use. Proper sealing of the unused product will prevent accidental curing and allow for a fresh product should users need to replenish areas in the future due to wildlife, human, or vehicle damage.

The bag mulched product includes a wide array of colors to suit any taste or project. Colors include the standard black, brown, and red. Also, orange, blue, yellow, violet, green and several others on a custom color request are also available.

Fragrances can also be an option. Each fragrance is color coordinated to match the individual mulch. Brown mulch having a cocoa aroma, yellow exuding a lemony scent, while black has a licorice fragrance. Orange is aroma of citrus, and red could reveal either strawberry or cherry. Violet portrays a grape scent, and green reminds of fresh mint.

The mulch product of the present invention does not possess a foul manure like odor that is present with other mulches. Also, applicant's product cures and remains stable all season long preventing washout and wind blow onto sidewalks, pathways, and parking areas, as well as keeping its rich dark color throughout the year.

The adhesive composition applied to a mulch covering results in a bonding of the mulch material when the adhesive is allowed to cure, with the effect of giving the treated area the ability to withstand outside forces, which lead to the breakdown and separation of the untreated mulch bed. This specifically formulated adhesive is particularly useful on the perimeter of landscaped areas, where mulch is in close proximity, or in contact with any hard surface such as curbs, sidewalks, parking areas, streets, and hardscaped displays. A heavy rain or exposure to a drainage area is particularly harmful to untreated mulch covers. Generally, the mulch will break apart, and in the case of flowing water, will wash away. Another adverse effect is that some types of mulch will bleed on an adjacent porous surface and leave an unsightly stain.

During lawn work, debris such as lawn clippings, twigs, leaves, etc., generally end up on the mulch bed. The accepted method for cleanup is to use a leaf blower to remove foreign matter from mulch covering causing the mulch to be blown about. The present invention will prevent this from being a factor so that the leaf blower does a great job of removing only the debris without disturbing the treated mulch bed.

The adhesive bond is strong enough to withstand the occasional person walking on the surface. The adhesive composition is environmentally safe and has been formulated to dry quickly even when applied to damp material. Drying time is generally two to three hours in 60 degree F. temperatures. A full cure occurs in five to seven hours with direct sunlight aiding to lower both of these time ranges. When cured, the adhesive is completely waterproof and holds up under a direct spray from a garden hose. The treated mulch does not experience a significant change in its original properties. The formula allows the mulch to retain its color, enhance the mulch's ability to retard weed growth, and prevent a burning object from penetrating the hard surface which makes a smoldering fire more difficult to start. Also, weed control, and fire retarding additives may be added to the adhesive composition. A very important benefit of the system is that it extends the useful life of the mulch cover greatly. With a dusting of new material and a treatment, the original mulch can last for many seasons. The cost of upkeep is lowered substantially.

The treated mulch when cured for six to eight hours at 60 degree F. temperatures will hold mulch beds in place for many months. The treated mulch offers protection against rain, wind, snow and weed growth.

The following are products produced by the present invention.

The mulch tech perimeter is a treated mulch in accordance with the present invention that when cured for six to eight hours at 60 degrees F. or above will hold mulch beds in place for many months. Protection is provided against rain, wind, and snow with the ability also to prevent weed growth up to 90% effectively. The mulch tech perimeter is fire resistant and resists mold growth, it will not foster root decay, and the mulch bed may be cleaned with a leaf blower to remove leaves, twigs, and other debris on the mulch surface. The mulch tech perimeter is environmentally safe, but the user should use gloves during the application.

The mulch tech decorator will be available in standard colors of red, black, green, white, and yellow. Special colors, other than those listed, will be available upon request.

The mulch tech decorator is a treated mulch that when cured for six to eight hours at 60 degrees F. or above will hold mulch beds in place for many months. It gives protection against rain, wind, and snow and the ability to prevent weed growth for up to 90% effectively. In addition, it is fire resistant, it resists mold growth, and will not foster root decay. The mulch tech decorator can be cleaned with a leaf blower to remove leaves, twigs, and other debris on the mulch surface. The mulch tech decorator is environmentally safe, but the user should use gloves during the application.

The mulch tech decorator is used to highlight plants, bushes, trees, and also design logos, names, artwork, and symbols. The mulch tech decorator will enhance landscape beds and areas such as retention ponds, berms and hills, it is an inexpensive way to identify a place or business that will last for years with minimum of upkeep. The mulch tech decorator applications are used in conjunction with the mulch tech perimeter to lock in the mulch tech decorator applications.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

BRIEF DESCRIPTION OF THE DRAWINGS

FIG. 1 is a flow diagram illustrating the method of the present invention.

I claim:

1. A method of treating mulch, comprising:
   applying an adhesive composition to an amount of bulk mulch to produce undried adhesive treated bulk mulch;
   sealing the undried adhesive treated bulk mulch in bags before the adhesive cures;
   transporting the bagged mulch to an area to be landscaped that is exposed to air and sunlight;
   removing the mulch from the bag;
   spreading the unbagged adhesive treated mulch into the area to be landscaped; and
   allowing the adhesive treated mulch to cure on the landscaped area by exposing to air and sunlight, thereby holding the adhesive treated mulch in place and preventing undesirable movement.

2. The method of claim 1, wherein the bulk mulch includes recycled wood products.

3. The method of claim 2, wherein the bulk mulch includes kiln dried pallet chips.

4. The method of claim 1, wherein the adhesive composition includes ethylene vinyl acetate.

5. The method of claim 4, wherein the adhesive composition includes:
   30-40% vinyl acetate polymers;
   less than 0.2% vinyl acetate monomers;
   60-70% water;
   less than 0.2% toluene; and
   less than 0.005% biocide.

6. The method of claim 1, wherein the bags are polyethylene bags.

7. The method of claim 6, wherein the polyethylene bags have a thickness of at least 3 mils.

8. The method of claim 1, wherein the adhesive composition further includes compounds selected from a group consisting of herbicides, pesticides, fire retardants, color pigments, and fragrances.

* * * * *